US006873489B2

(12) United States Patent
Ho et al.

(10) Patent No.: US 6,873,489 B2
(45) Date of Patent: Mar. 29, 2005

(54) METHOD, SYSTEM, AND PROGRAM FOR ESTIMATING COIL RESISTANCE OF A VOICE COIL MOTOR IN A DISK DRIVE SYSTEM

(75) Inventors: Peter Kui Ho, Morgan Hill, CA (US); Mantle Man-Hon Yu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 132 days.

(21) Appl. No.: 10/107,832

(22) Filed: Mar. 25, 2002

(65) Prior Publication Data

US 2003/0179486 A1 Sep. 25, 2003

(51) Int. Cl.$^7$ ............................................. G11B 5/596
(52) U.S. Cl. ..................................................... 360/78.05
(58) Field of Search .............................. 360/71, 78.05, 360/75, 78.06, 78.09, 265.8, 59, 74.7, 77.03, 78.12, 78.13, 265.9, 264.7, 266.4, 294.5

(56) References Cited

U.S. PATENT DOCUMENTS

| | | | | |
|---|---|---|---|---|
| 5,457,402 A | * | 10/1995 | Sato ............................ | 324/772 |
| 5,594,603 A | | 1/1997 | Mori et al. | |
| 5,781,363 A | * | 7/1998 | Rowan et al. ............ | 360/78.09 |
| 5,844,743 A | | 12/1998 | Funches | |
| 5,963,393 A | * | 10/1999 | Rowan et al. ............ | 360/78.06 |
| 5,982,130 A | * | 11/1999 | Male ........................... | 318/615 |
| 6,188,191 B1 | | 2/2001 | Frees et al. | |
| 6,216,050 B1 | | 4/2001 | Ono et al. | |
| 6,219,196 B1 | | 4/2001 | Semba et al. | |
| 6,229,663 B1 | * | 5/2001 | Yoneda et al. ................ | 360/75 |
| 6,342,985 B1 | | 1/2002 | Clare et al. | |
| 6,366,865 B1 | * | 4/2002 | Chalupa et al. ................ | 702/65 |
| 6,496,319 B1 | * | 12/2002 | Kusumoto et al. ............ | 360/75 |
| 6,515,820 B1 | * | 2/2003 | Burton et al. ............ | 360/78.06 |
| 6,594,106 B1 | * | 7/2003 | Serrano et al. .......... | 360/78.09 |
| 6,600,633 B2 | * | 7/2003 | Macpherson et al. .... | 360/265.8 |

OTHER PUBLICATIONS

"Advanced Servo–Mechanical Design Facilitates Improved Performance and Reliability", published by IBM and available on the internet at: http://www.ibm.com/harddrive, 1999, pp. 1–4.

S. J. Hwang, "Noise and Vibration Control Technology in Hard Disk Drives", DataTech, date unknown, pp. 99–106, downloaded from the Internet on Jan. 29, 2002.

Y. Li, et al., "Track–Following Controller Design of MEMS Based Dual–Stage Servos in Magnetic Hard Disk Drives", Computer Mechanics Lab. Dept. of Mechanical Engineering, University of Berkeley, California, date unknown.

Lintech, "Chapter 10. Hard Disk Drives", online, date unknown, pp. 1–20. (Retrieved on Mar. 25, 2001). Retrieved from the Internet at URL: <http://www.lintech.org/comp-per/index.html>.

* cited by examiner

*Primary Examiner*—David Hudspeth
*Assistant Examiner*—Fred F. Tzeng
(74) *Attorney, Agent, or Firm*—David W. Victor; Konrad, Raynes, & Victor LLP (57) ABSTRACT

Provided are a method, system, and program for estimating coil resistance of a voice coil motor for an actuator assembly in a disk drive system. An estimation is made of a calibration coil resistance during a calibration operation. A determination is made of a distance moved during a seek operation. The determined distance and the calibration coil resistance are used to estimate a current coil resistance following the seek operation.

50 Claims, 4 Drawing Sheets

METHOD, SYSTEM, AND PROGRAM FOR ESTIMATING COIL RESISTANCE OF A VOICE COIL MOTOR IN A DISK DRIVE SYSTEM

BACKGROUND OF THE INVENTION

1. Field of the Invention

The present invention relates to a method, system, and program for estimating coil resistance of a Voice Coil Motor (VCM) in a disk drive system.

2. Description of the Related Art

Computer hard disk drives include one or more disks of magnetic storage medium and a disk drive head assembly to read and write data on the magnetic storage medium. Magnoresistive (MR) heads typically include a write element comprised of a thin film inductive head and a read element comprised of a sensor. MR heads for the disk surfaces of the disk drive are affixed to an actuator or arm that glides across the disk surface to position the head at different track locations. Current is passed to a voice coil motor (VCM) to position the actuator with respect to the disk surface. The amount of torque applied to the actuator is governed by the amount of current in the VCM. The VCM comprises the coil that receives the current and two magnets. During operations, the disk drive components, such as the VCM, can produce vibrations induced as a result of the resonance of the components. Such vibrations may result in undesirable head variations and tracking errors.

One factor leading to an increase demand in attenuating vibrations and noise produced by the VCM is the increased demand for higher storage capacity and faster Input/Output (I/O) access in disk drives. High disk operation speeds require higher voltages to generate more current to the VCM so that sufficient torque is created to actuate movement of the actuator (head-arm) assembly at the higher speeds. Higher voltages subjects the VCM to greater acoustic and mechanical energy, which may result in increased noise and vibrational problems.

In current disk drive systems, to correct for tracking errors resulting from noise and vibrations from components such as the VCM, the disk drive controller will read servo information indicating the actual current position and compare that value read to the desired position. The drive controller will then calculate a current to apply to the VCM to correct any variation in the measured position versus desired position. Thus, the current supplied to the VCM to apply torque to the actuator arm is a function both of the amount of current in the voice coil supplied by an amplifier controlled by the drive controller and by position feedback adjustments based on position information read from the data heads.

Other techniques to reduce VCM vibrational noise includes the use of lighter and stiffer suspension elements in the actuator that have much higher natural frequencies. Also smaller and lighter slider designs provide less contact areas for the transmission of vibrations and noise from the VCM. However, there are design constraints on further reductions in size of the actuator to reduce vibrations and noise. Another solution to alleviate noise is to use suspension dampers to dissipate energy transmitted through the actuator and reduce the amount of vibrations and noise produced by the VCM.

Notwithstanding the current efforts to reduce the vibrations and noise produced by the VCM, there is a continued need in the art to attenuate the effect of vibrations and noise emanating from the VCM on disk drive performance.

SUMMARY OF THE PREFERRED EMBODIMENTS

Provided are a method, system, and program for estimating coil resistance of a voice coil motor for an actuator assembly in a disk drive system. An estimation is made of a calibration coil resistance during a calibration operation. A determination is made of a distance moved during a seek operation. The determined distance and the calibration coil resistance are used to estimate a current coil resistance following the seek operation.

In further implementations, a distance moved during the calibration operation is measured. The measured initial coil resistance and the measured distance moved during the calibration operation are used to estimate the calibration coil resistance.

An equation is provided that correlates a change in distances moved to a change in coil resistances. The calibration coil resistance is calculated by using the equation to determine the change in coil resistance from the distance moved during the calibration operation. The change in coil resistance is the difference of the coil resistance following the seek operation and the calibration coil resistance. The calibration coil resistance is added to the determined change in coil resistances to estimate the coil resistance following the seek operation.

Still further, a coil temperature may be estimated from the estimated coil resistance following the seek operation.

Yet further, the estimated coil temperature may be used to modify control output to the voice coil motor for subsequent seek operations.

The described implementations provide techniques for estimating the coil resistance and temperature with an improved degree of accuracy using both the distance and duration of a previous seek operation. The estimated temperature may then be used to modify control output to improve the performance of disk drive operations, such as by generate a voice coil motor current in a manner that reduces a likelihood of track misregistration errors resulting from vibrations of the voice coil motor.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
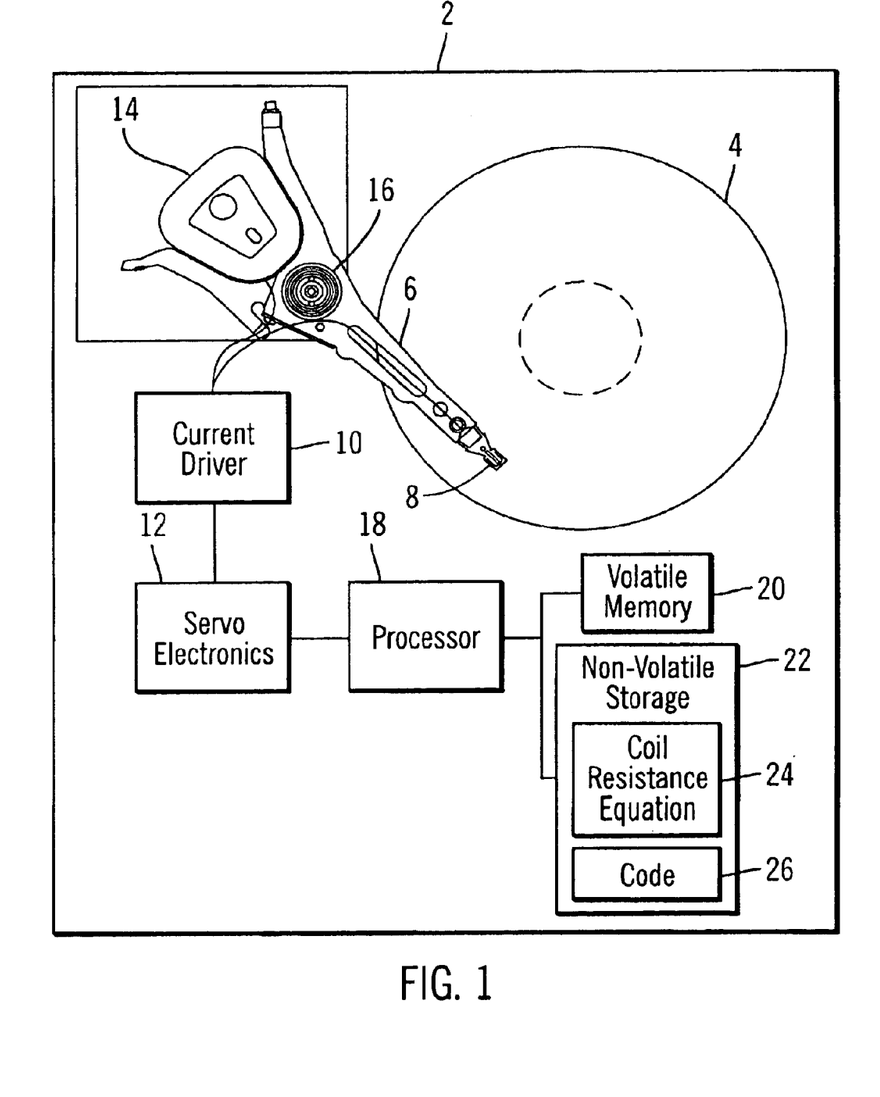
FIG. 1 illustrates a disk drive architecture in which aspects of the invention are implemented.

FIG. 1 illustrates a disk drive system 2, including one or more rotating disks 4 (only one is shown), an actuator assembly 6 to move a head assembly 8 across the disk 4 surface. The disk drive system 2 further includes a current driver 10 that converts the digital signal of a calculation from servo electronics 12 or processor 18 to actual current that is applied to a voice coil motor (VCM) 14. The VCM 14 comprises a coil that sits between two magnets. The current driver 10 applies current to the VCM 14 to cause the coil to react and move through a magnetic field to move the actuator 6.

In certain implementations, the head 8 is a magnetoresistive (MR) head device. However, in alternative implementations, the head 8 may be constructed of other materials known in the art. The servo electronics 12 provides a closed loop feedback system to insure that the head follows the tracks accurately and to control smooth transitions when the head "seeks" from one track location to another track. The servo electronics 12 calculates the position error signal (PES) from the actual position data and from pre-recorded servo information either on a dedicated servo disk or on servo sectors interspersed among the data sectors on the disk. The servo electronics 12 uses the servo information to determine PES, which is the signal proportional to the difference between the ideal center line tracking and the actual positions of the head assembly 8. The servo electronics 12 may then calculate a corrective position signal based on the PES. The actuator 6 pivots around a shaft 16 in response to the torque produced by the VCM 14.

A processor 18 manages read/write operations and controls other disk operations. The processor 18 may perform certain of the operations to calculate PES, NRRO, and determine a corrective signal. Alternatively, the servo electronics 12 may calculate the PES and NRRO in manners known in the art. The processor 18 utilizes a volatile memory 20, such as a random access memory (RAM) or registers as a working memory in which instructions and data are temporarily loaded for program execution. A non-volatile storage 22, such as a read-only memory (ROM), programmable ROM (PROM), electronically programmable ROM (EPROM), flash memory, etc., stores program instructions and constants, referred to as code 26, loaded and executed by the processor 18 to perform the disk drive operations. Alternatively, the code 26 described herein as performed by processor 18 along with the volatile memory 20 and non-volatile storage 22 may be implemented as hardware, such as an Application Specific Integrated Circuit (ASIC).

In the described implementations, the processor 18 estimates the temperature of the VCM 14 for use in determining an adjustment signal to transmit to the current driver 10 to control the current supplied to the VCM 14 to move the actuator arm 6. With the described implementations, temperature is measured during intended customer use. In order to estimate coil resistance during seek operations, in certain implementations the non-volatile storage 22 may maintain a coil resistance equation 24 that provides a correlation of a distance the actuator head moves to coil resistance of the VCM 14.

The distance traveled by a head can relate to the coil resistance of the VCM 14 by considering the equation for acceleration of the head assembly 8, which can be calculated as shown in equation (1) below:

$$acc(t) = (kt*L)/J*(Vcoil - Velocity*kt)/Rcoil \quad (1)$$

In the above equation (1) to calculate acceleration (acc) as a function of time, the following variables and constants are used:

kt=the torque constant of the VCM 14, which is the amount of torque generated per unit of current.

L=the length constant, which is the length of the actuator assembly 6 between the head assembly 8 and the pivot point 16.

J=is a constant of the inertia of the VCM 14.

Vcoil=the voltage applied to the VCM 14 during the seek operation, may vary between seek operations.

Velocity=the angular velocity variable of the VCM 14 during the seek operation.

Rcoil=the coil resistance, which is the variable to calculate.

The distance (x) the head assembly 8 travels between the time of the seek from $t_0$ to $t_1$ is modeled by the following equation (2) below:

$$\int \int_{t=t_0}^{t_1} (kt*L)/J*(Vcoil - Velocity*kt)/Rcoil \, dt \quad (2)$$

The Velocity is the speed traveled between the seek distance during the seek duration. The solution to the above differential equation for a distance (x) traveled may be expressed as equation (3) below:

$$x = Vcoil*L/kt*(t - \tau*(1 - e^{(-t/\tau)})), \quad (3)$$

where $\tau = Rcoil*J/kt^2$

Figure 2:
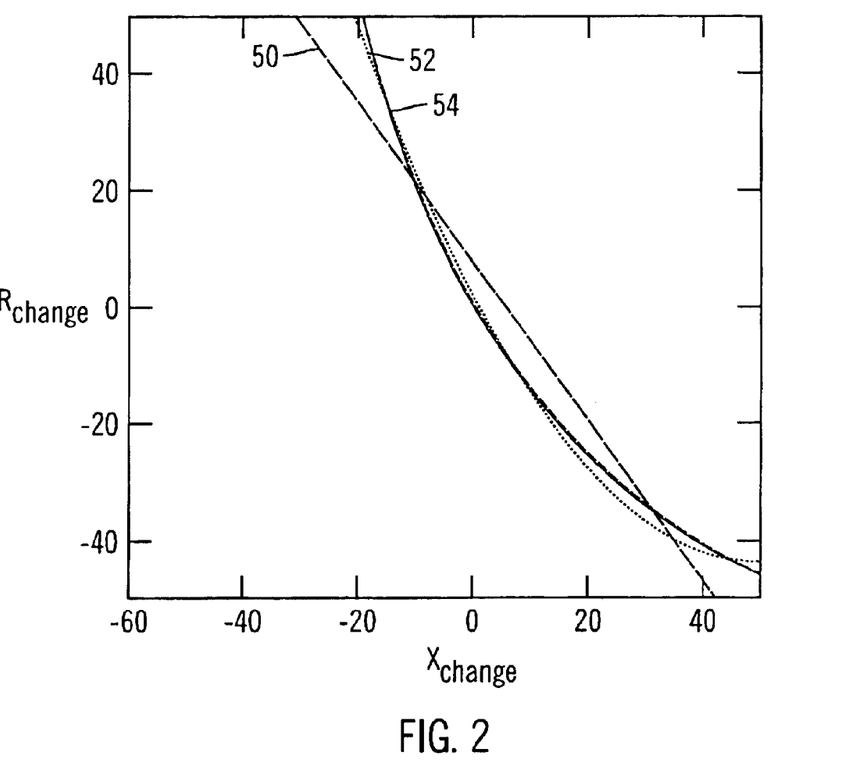
FIG. 2 illustrates curves providing a correlation of a change in distances moved by the actuator head and a change in coil resistances in accordance with implementations of the invention.

Numerical analysis techniques known in the art can be used to provide a polynomial approximation of equation (3) that correlates resistance as a function of a change in distance moved. In certain implementations, the solution of equation (3) provides an equation that correlates a change in distance moved ($X_{change}$) and a change in coil resistance ($R_{change}$), calculated as follows according to equations (4) and (5):

$$x_{change} = x_n - x_0 \quad (4)$$

$$Rcoil_n = R_{change} + Rcoil_0 \quad (5)$$

where $Rcoil_n$ is the coil resistance measured at a time n after the actuator assembly 6 is moved a distance $x_n$, and $Rcoil_0$ is an initial coil resistance measured after the actuator assembly 6 moves an initial distance ($x_0$), such as during calibration. FIG. 2 illustrates curves generated as the first order 50, second order 52, and third order 53 polynomial solutions to equation (3) as a function of the $R_{change}$ and $x_{change}$. Below is an example of three different equations (6), (7), and (8) modeling the curves 50, 52, and 54, respectively, which provide numerical polynomial approximations of equation (3).

$$R_{change} = -0.137 * x_{change} + 0.773 \quad (6)$$

$$R_{change} = 0.21 * x_{change}^2 - 0.189 * x_{change} + 0.00189 \quad (7)$$

$$R_{change} = -0.0002799 * x_{change}^3 - 0.184 * x_{change}^2 + 0.003126 * x_{change} - 0.00002637 \quad (8)$$

The above equation polynominal solutions of equations (6), (7), and (8) are calculated based on a particular set of coil parameters (kt, L, J, Vcoil) using numerical analysis algorithms. Alternative polynominal equations may be generated for different coil parameters.

The coil resistance equation 24 in the non-volatile storage 22 may be any one of the equations (6), (7), and (8), or any other equation providing a solution to equation (3) or a correlation of coil resistance and seek distance moved by the actuator head 8. The particular coil resistance equation 24 selected would depend upon the computational capabilities of the processor 18. The higher order polynomial solution, e.g., equation (8), may be used with more powerful processes, whereas the lower order polynomial, e.g., equation (6), may be used for less powerful processors.

Figure 3:
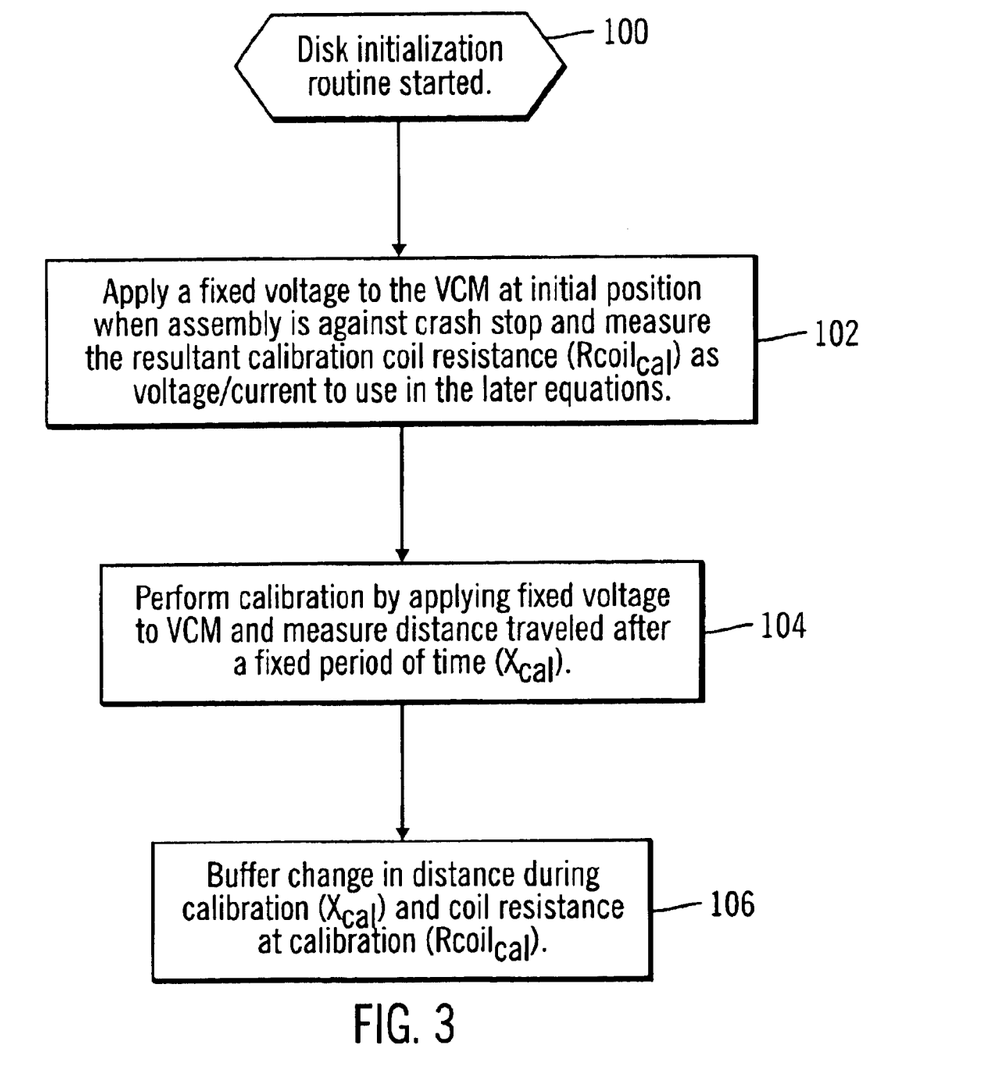
FIGS. 3 and 4 illustrate logic to estimate the coil resistance and temperature of the voice coil motor and adjust the current in accordance with implementations of the invention.

FIG. 3 illustrates logic implemented in code 26 in the non-volatile storage 22 loaded and executed by the processor 18 to determine a calibration coil resistance for a seek distance moved during calibration that is used to determine the coil resistance during subsequent seek operations. Control begins at block 100 during the disk initialization routine. During initialization, the processor 18 generates (at block 102) a signal for a fixed voltage to the VCM 14 while the actuator assembly 6 is positioned against a crash stop and determines the calibration coil resistance ($Rcoil_{cal}$) as the applied voltage divided by the measured resultant current (voltage/current) to be used in subsequent operations. In alternative implementations, the coil resistance can be measured by twice applying voltage to the VCM 14 while the actuator assembly 6 is stationary at the crash stop. In such cases, the processor 18 would measure the corresponding coil current during each movement, and then measure coil resistance according to equation (9) below:

$$Rcoil_{cal} = (voltage1 - voltage2)/(coil\ current1 - coil\ current2) \quad (9)$$

Voltage 1 is applied with the actuator assembly 6 positioned against the crash stop and the resultant coil current 1 is measured. Next, voltage 2 is applied and the resultant coil current 2 is measured. From such gathered data, the initial coil resistance ($Rcoil_1$) can be measured according to equation (9) above.

After measuring this calibration coil resistance ($Rcoil_{cal}$), the processor 18 measures a calibration distance ($x_{cal}$) by applying a fixed voltage to the VCM 14 to measure the distance ($x_{cal}$) traveled at full acceleration for a fixed period of time. The distance measured may be in units of tracks. The processor 18 then buffers (at block 106) in volatile memory 20 the distance moved during calibration ($x_{cal}$) and the estimated calibration coil resistance ($Rcoil_{cal}$) for use in subsequent seek operations.

Figure 4:
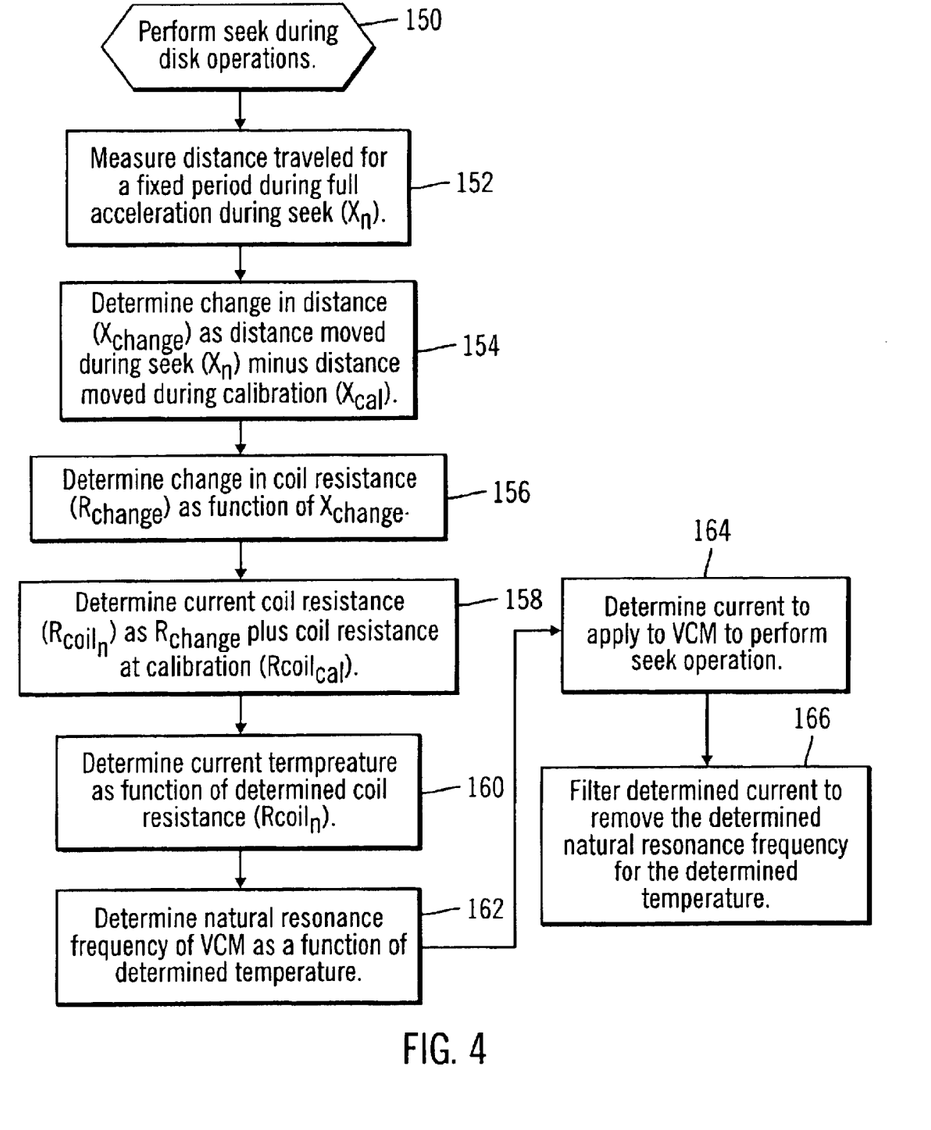

FIG. 4 illustrates logic implemented in the code 26 in the non-volatile memory 22, which is loaded and executed by the processor 18 to measure the coil resistance during seek operations during use of the disk drive 2 and utilize such measured coil resistance. Upon performing a seek operation (at block 150) during normal disk 2 operations, the distance the actuator head 8 moves during the seek ($x_n$) for a fixed period of time during full acceleration is measured (at block 152). The change in distance ($x_{change}$) is then calculated (at block 154) as the distance moved during the seek ($x_n$) minus the buffered seek distance moved during calibration ($X_{cal}$). The processor 18 then uses the coil resistance equation 24 to calculate (at block 156) the change in coil resistance ($R_{change}$) as a function of the measured change in distance ($x_{change}$). The coil resistance for the current seek ($Rcoil_n$) is then calculated by adding (at block 158) the coil resistance at calibration ($Rcoil_{cal}$) to the determined change in coil resistance ($R_{change}$)

After estimating the current coil resistance following the seek operation ($Rcoil_n$), the code 26 may provide further algorithms for utilizing the current coil resistance to improve disk drive 2 performance. For instance, at block 160, the processor 18 uses the calculated coil resistance ($Rcoil_n$) to estimate the temperature of the VCM 14. The code 26 may maintain an empirically determined correlation of coil resistance to temperature for the particular VCM 14, to perform the operation at block 160 to calculate the temperature from the determined coil resistance. The processor 18 may then estimate (at block 162) the resonance frequency from the determined temperature from an empirically determined correlation of resonance frequencies and temperatures for the particular VCM 14 maintained in the code 26 non-volatile storage 22. The processor 18 would then determine (at block 164) the current needed to control the voice coil motor 14 to perform the seek operation, i.e, move the head assembly 8 from the current to the desired position. In determining the current to apply, the processor 18 may read position information from the disk to determine a position error signal (PES) to minimize track misregistration and/or Non-Repeatable Run Out (NRRO) errors in a manner known in the art. The processor 18 then filters (at block 166) the determined current to remove the determined resonance frequency for the determined temperature. The result is a current attenuated for the frequency correlated with the estimated temperature.

In further implementations, the measured coil resistance at block 158 may be used to estimate temperature to monitor the temperature of the VCM 14 in order to prevent overheating. If the VCM 14 is reaching a temperature threshold, then the processor 18 may modify the velocity profile of the actuator assembly. Those skilled in the art will appreciate that there are alternative uses of the temperature estimated during disk operations to improve disk drive performance 2.

In an alternative implementation, the coil resistance equation 24 may provide a solution of equation (3) as a function of the distance (x) and duration of the seek (t) at block 104, using the known constants, such as Kt, L, J maintained in the non-volatile storage 22, as well as the variable of the applied voltage (Vcoil) supplied by the processor 18.

In still further implementations, the calibration coil resistance ($Rcoil_{cal}$) may be used to determine a coil resistance error offset that is the difference of the calibration coil resistance ($Rcoil_{cal}$) and the initial measured coil resistance ($Rcoil_i$) when the actuator assembly 16 is positioned against the crash stop. This error offset may then be applied to any subsequently determined coil resistance ($Rcoil_n$) calculated during normal seek operations.

In certain implementations, at block 106, the processor 18 would use the equation (3) to estimate the resistance of the VCM 14 during disk operations to estimate temperature. In alternative implementations, the processor 18 may use an empirically determined correlation between velocity and a change of resistance to estimate the change of resistance based on the velocity of the seek operation. This relationship of velocities and resistance changes may be maintained in the non-volatile storage 22 as a table. The estimated change of resistance would be applied to the previously determined resistance, buffered in the volatile memory 20, to determine the current resistance as a function of the velocity of the performed seek operation.

With the described implementations, coil resistance and temperature are estimated during normal disk operations and used to adjust disk operations to optimize performance. For instance, the estimated temperature may be used in a feedback system to eliminate the resonance frequency of the VCM 14 and thereby substantially reduce noise and vibrations resulting from the VCM 14. To filter out the resonance frequency, the processor may determine filter function adjustment coefficients that can eliminate the resonance frequency from an input signal. The processor 18, or other circuitry, would then use a position readback signal to derive the broadband actuating signal to move the head 8 to the target location, taking into account any position error signal (PES) or NRRO adjustments known in the art that are used to reduce track misregistration. The processor 18 may then apply the coefficients to the derived current needed to move the actuator assembly 6 to the target position to remove the resonance frequency. In certain implementations, a separate filter, such as a notch filter, may be used to remove the resonance frequency. Further details of using a notch filter to filter a signal to remove the resonance frequency is described in the commonly assigned U.S. Pat. No. 6,188, 191, which patent is incorporated herein by reference in its entirety.

Further, the described implementations provide a technique for estimating the current temperature of the VCM 14 with a high degree of accuracy without having to provide for additional sensors or hardware structures. Instead, the processor 18, or other control circuitry, can estimate the temperature using information generated during seek operations during normal customer use of the drive.

ADDITIONAL IMPLEMENTATION DETAILS

The described logic for estimating coil resistance and using such coil resistance in disk drive operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.) Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the temperature was used to estimate a resonance frequency of the VCM 14 for use in determining dampening coefficients to apply to the current to remove the resonance frequency. In additional implementations, the determined temperature may be used to determine other ways to modify the VCM current to reduce the likelihood of track misregistration, errors, and damage to the disk drive. For instance, the estimated temperature may be used to determine a corresponding delay to apply before transmitting the current to the VCM 14, i.e., a cooling-off period, if the VCM 14 temperature exceeds an upper threshold.

Still further, the current signal may be attenuated in ways other than removing the resonance frequency to reduce the likelihood of tracking errors. For instance, applying sufficient current to the VCM 14 at high temperatures can degrade and damage the VCM 14, such as by degrading the laminations on the coil. In certain implementations, upon detecting upper threshold temperatures for the VCM 14, the current supplied to the VCM 14 can be reduced to avoid degradation to the VCM 14 structure.

The described implementations included a specific equation for use in estimating the coil resistance. In alternative implementations, different equations related to acceleration may be used to estimate resistance. Alternatively, equations not related to acceleration may also be used to estimate resistance.

Certain implementations were described with respect to MR heads. However, the head assembly 8 may be implemented with read and/or write heads other than MR heads, e.g., ferrite, MIG, thin film, GMR, one-sided, two-sided, etc., to determine non-mechanical noise arising from structural defects.

The described implementations may be implemented in disk drives that include multiple platters and multiple heads to read from one or both surfaces of each platter.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for estimating coil resistance of a voice coil motor for an actuator assembly in a disk drive system, comprising:

estimating a calibration coil resistance during a calibration operation;

determining a distance moved during a seek operation; and using the determined distance and the calibration coil resistance to estimate a current coil resistance following the seek operation.

2. The method of claim 1, wherein the distance moved during the seek operation is moved far a fixed period of time during full acceleration of the seek operation.

3. The method of claim 1, further comprising:

measuring a distance moved during the calibration operation, wherein the measured calibration coil resistance and the measured distance moved during the calibration operation are used to estimate the calibration coil resistance.

4. The method of claim 3, wherein the distance moved during the calibration operation is moved for a fixed period of time during full acceleration of a seek operation.

5. The method of claim 3, further comprising:

using the distance moved during the calibration operation along with the determined distance moved during the seek operation and the calibration coil resistance to estimate the current coil resistance.

6. The method of claim 3, further comprising:

providing an equation that correlates a change in distances moved to a change in coil resistances, wherein the calibration coil resistance is calculated by:

(i) using the equation to determine the change in coil resistance in a difference of the distance moved during the seek operation and the distance moved during the calibration operation, wherein the change in coil resistances comprises the difference of the coil resistance following the seek operation and the calibration coil resistance; and (ii) adding the calibration coil resistance to the determined change in coil resistances to estimate the coil resistance following the seek operation.

7. The method of claim 6, wherein the equation comprises a solution of an acceleration function for the voice coil motor that includes as variables the determined distance and duration and the generated current for the seek operation to determine the resistance.

8. The method of claim 7, wherein the equation comprises a solution of a function of a distance moved that is derived from the acceleration function, wherein the function of the distance moved comprises:

$$x = Vcoil*L/kt*(t-\tau*(1-\epsilon^{(-t/\tau)})),$$

wherein x is the determined distance, Vcoil is the generated current for the seek operation, L is a length of an actuator assembly of the disk drive system, is an inertia of the voice coil motor, kt is a torque constant for the voice coil motor, and $\tau = Rcoil*J/kt^2$.

9. The method of claim 8, wherein the equation comprises a polynomial solution of the function of the distance moved.

10. The method of claim 1, further comprising:
estimating a coil temperature from the estimated coil resistance following the seek operation.

11. The method of claim 10, further comprising:
using the estimated coil temperature to modify control output to the voice coil motor for subsequent seek operations.

12. The method of claim 11, further comprising;
determining whether the estimated coil temperature exceeds a threshold temperature, wherein modifying the control output comprises reducing power consumption if the estimated coil temperature exceeds the threshold temperature.

13. The method of claim 11, wherein the control output to the voice coil motor is modified in a manner that reduces a likelihood of track misregistration errors resulting from vibrations of the voice coil motor.

14. The method of claim 11, further comprising:
determining whether the estimated temperature exceeds a threshold, wherein modifying the control output to the voice coil motor for subsequent seek operations comprises lowering a voltage of the determined subsequent current if the temperature exceeds the threshold.

15. The method of claim 14, wherein the subsequent current is not adjusted if the temperature does not exceed the threshold.

16. The method of claim 11, further comprising:
determining whether the estimated temperature exceeds a threshold, wherein modifying the control output to the voice coil motor for subsequent seek operations comprises delaying application of the subsequent current to the voice coil motor.

17. The method of claim 11, wherein modifying the control output to the voice coil motor for subsequent seek operations comprises adjusting the current to account for a position error signal independent of the adjustment based on the determined temperature.

18. The method of claim 1, wherein the seek operation is performed during normal disk drive operations.

19. A method for estimating coil resistance of a voice coil motor for an actuator assembly in a disk drive system, comprising:

estimating a calibration coil resistance during a calibration operation;

estimating a coil temperature from the estimated coil resistance following the seek operation;

determining a distance moved during a seek operation;

using the determined distance and the calibration coil resistance to estimate a current coil resistance following the seek operation;

estimating a resonance frequency of the voice coil motor from the estimated temperature; and using the estimated coil temperature to modify control output to the voice coil motor for subsequent seek operations removing the determined resonance frequency from a current generated for at least one subsequent seek operation.

20. The method of claim 19, further comprising:
providing a correlation of temperatures and resonance frequencies for the voice coil motor, wherein the estimated resonance frequency is determined from the correlation and the estimated temperature.

21. The method of claim 19, wherein removing the determined resonance frequency from the generated current further comprises:

determining coefficients to filter the determined resonance frequency;

determining a subsequent current to supply to the voice coil motor to perform the subsequent seek operation; and applying the determined coefficients to the determined subsequent current to filter the determined resonance frequency from the subsequent current to produce a filtered subsequent current to supply to the voice coil motor for the subsequent seek operation.

22. An actuator assembly in a disk drive system, comprising:

a voice coil motor;

means for estimating a calibration coil resistance of the voice coil motor during a calibration operation;

means for determining a distance moved during a seek operation; and means for using the determined distance and the calibration coil resistance to estimate a current coil resistance of the voice coil motor following the seek operation.

23. The system of claim 22, further comprising:
means for measuring a distance moved during the calibration operation, wherein the measured calibration coil resistance and the measured distance moved during the calibration operation are used to estimate the calibration coil resistance.

24. The system of claim 23, further comprising:
means for using the distance moved during the calibration operation along with the determined distance moved during the seek operation and the calibration coil resistance to estimate the current coil resistance.

25. The system of claim 23, further comprising:
means for providing an equation that correlates a change in distances moved to a change in coil resistances;

means for using the equation to determine the change in coil resistance in a difference of the distance moved during the seek operation and the distance moved during the calibration operation, wherein the change in coil resistances comprises the difference of the coil resistance following the seek operation and the calibration coil resistance; and means for adding the calibration coil resistance to the determined change in coil resistances to estimate the coil resistance following the seek operation.

26. The system of claim 22, further comprising:
means for estimating a coil temperature from the estimated coil resistance following the seek operation.

27. The system of claim 26, further comprising:
means for using the estimated coil temperature to modify control output to the voice coil motor for subsequent seek operations.

28. An actuator assembly in a disk drive system, comprising:
a voice coil motor;
means for estimating a calibration coil resistance of the voice coil motor during a calibration operation;
means for estimating a coil temperature from the estimated coil resistance following the seek operation;
means for determining a distance moved during a seek operation; and
means for using the determined distance and the calibration coil resistance to estimate a current coil resistance of the voice coil motor following the seek operation
means for estimating a resonance frequency of the voice coil motor from the estimated temperature; and
means for using the estimated coil temperature to modify output to the voice coil motor for subsequent seek operations removing the determined resonance frequency from a current generated for at least one subsequent seek operation.

29. The system of claim 28, further comprising:
means for providing a correlation of temperatures and resonance frequencies for the voice coil motor, wherein the estimated resonance frequency is determined from the correlation and the estimated temperature.

30. An article of manufacture including code for estimated coil resistance of a voice coil motor for an actuator assembly in a disk drive system, wherein the code causes operations to be performed, the operations comprising:
estimating a calibration coil resistance during a calibration operation;
determining a distance moved during a seek operation; and
using the determined distance and the calibration coil resistance to estimate a current coil resistance following the seek operation.

31. The article of manufacture of claim 30, wherein the distance moved during the seek operation is moved for a fixed period of time during full acceleration the seek operation.

32. The article of manufacture of claim 30, further comprising:
measuring a distance moved during the calibration operation, wherein the measured calibration coil resistance and the measured distance moved during the calibration operation are used to estimate the calibration coil resistance.

33. The article of manufacture of claim 32, wherein the distance moved during the calibration operation is moved for a fixed period of time during full acceleration of a seek operation.

34. The article of manufacture of claim 32, further comprising:
using the distance moved during the calibration operation along with the determined distance moved during the seek operation and the calibration coil resistance to estimate the current coil resistance.

35. The article of manufacture of claim 32, further comprising:
providing an equation that correlates a change in distances moved to a change in coil resistances, wherein the calibration coil resistance is calculated by:
(i) using the equation to determine the change in coil resistance in a difference of the distance moved during the seek operation and the distance moved during the calibration operation, wherein the change in coil resistances comprises the difference of the coil resistance following the seek operation and the calibration coil resistance; and
(ii) adding the calibration coil resistance to the determined change in coil resistances to estimate the coil resistance following the seek operation.

36. The article of manufacture of claim 35, wherein the equation comprises a solution of an acceleration function for the voice coil motor that includes a variables the determined distance and duration and the generated current for the seek operation to determine the resistance.

37. The article of manufacture of claim 36, wherein the equation comprises a solution of a function of a distance moved that is derived from the acceleration function, wherein the function of the distance moved comprises:

$$x = Vcoil*L/kt*(t-\tau*(1-e^{(-t/\tau)})),$$

wherein x is the determined distance, Vcoil is the generated current for the seek operation, L is a length of an actuator assembly of the disk drive system, J is an inertia of the voice coil motor, kt is a torque constant for the voice coil motor, and $\tau = Rcoil*J/kt^2$.

38. The article of manufacture of claim 37, wherein the equation comprises a polynomial solution of the function of the distance moved.

39. The article of manufacture of claim 30, further comprising:
estimating a coil temperature from the estimated coil resistance following the seek operation.

40. The article of manufacture of claim 39, further comprising:
using the estimated coil temperature to modify control output to the voice coil motor for subsequent seek operations.

41. The article of manufacture of claim 40, further comprising;
determining whether the estimated coil temperature exceeds a threshold temperature, wherein modifying the control output comprises reducing power consumption if the estimated coil temperature exceeds the threshold temperature.

42. The article of manufacture of claim 40, wherein the control output to the voice coil motor is modified in a manner that reduces a likelihood of track misregistration errors resulting from vibrations of the voice coil motor.

43. The article of manufacture of claim 40, further comprising:
determining whether the estimated temperature exceeds a threshold, wherein modifying the control output to the voice coil motor for subsequent seek operations comprises lowering a voltage of the determined subsequent current if the temperature exceeds the threshold.

44. The article of manufacture of claim 43, wherein the subsequent current is not adjusted if the temperature does not exceed the threshold.

45. The article of manufacture of claim 40, further comprising:

determining whether the estimated temperature exceeds a threshold, wherein modifying the control output to the voice coil motor for subsequent seek operations comprises delaying application of the subsequent current to the voice coil motor.

46. The article of manufacture of claim 40, wherein modifying the control output to the voice coil motor for subsequent seek operations comprises adjusting the current to account for a position error signal independent of the adjustment based on the determined temperature.

47. The article of manufacture of claim 30, wherein the seek operation is performed during normal disk drive operations.

48. An article of manufacture including code for estimating coil resistance of a voice coil motor for an actuator assembly in a disk drive system, wherein the code causes operations to be performed, the operations comprising:

estimating a calibration coil resistance during a calibration operation;

estimating a coil temperature from the estimated coil resistance following the seek operation;

determining a distance moved during a seek operation;

using the determined distance and the calibration coil resistance to estimate a current coil resistance following the seek operation;

estimating a resonance frequency of the voice coil motor from the estimated temperature; and using the estimated coil temperature to modify control output to the voice coil motor for subsequent seek operations removing the determined resonance frequency from a current generated for at least one subsequent seek operation.

49. The article of manufacture of claim 48, further comprising:

providing a correlation of temperatures and resonance frequencies for the voice coil motor, wherein the estimated resonance frequency is determined from the correlation and the estimated temperature.

50. The article of manufacture of claim 48, wherein removing the determined resonance frequency from the generated current further comprises:

determining coefficients to filter the determined resonance frequency;

determining a subsequent current to supply to the voice coil motor to perform the subsequent seek operation; and applying the determined coefficients to the determined subsequent current to filter the determined resonance frequency from the subsequent current to produce a filtered subsequent current to supply to the voice coil motor for the subsequent seek operation.

* * * * *

UNITED STATES PATENT AND TRADEMARK OFFICE
CERTIFICATE OF CORRECTION

| | |
|---|---|
| PATENT NO. | : 6,873,489 B2 |
| APPLICATION NO. | : 10/107832 |
| DATED | : March 29, 2005 |
| INVENTOR(S) | : Peter Kui Ho and Mantle Man-Hon Yu |

It is certified that error appears in the above-identified patent and that said Letters Patent is hereby corrected as shown below:

Column 8, line 45, delete "far" and add -- for -- .
Line 50, delete "the" and add -- a -- .
Line 67, delete "in" and add -- from -- .

Column 9, line 21, delete "system, is" and add -- system, J is -- .

Column 10, line 4, delete "the" and add -- a -- .
Line 5, delete "a seek" and add -- the seek -- .
Line 11, delete "estimated temperature" and add -- estimated coil temperature -- .
Line 14, delete "operations removing" and add -- operations by removing -- .
Line 48, delete "wherein the" and add -- wherein a -- .
Line 62, delete "resistance in" and add -- resistance from -- .

Column 11, line 17, delete "following the" and add -- following a -- .
Line 18, delete "during a" and add -- during the -- .
Line 24, delete "estimated temperature" and add -- estimated coil temperature -- .
Line 26, delete "output to" and add -- control output to -- .
Line 37-38, delete "estimated" and add -- estimating -- .
Line 50, delete "acceleration the" and add -- acceleration of the -- .
Line 56, delete "wherein the" and add -- wherein a -- .

Column 12, line 9, delete "resistance in" and add -- resistance from -- .
Line 20, delete "includes a" and add -- includes as -- .

Column 13, line 23, delete "following the" and add -- following a -- .
Line 24, delete "during a" and add -- during the -- .

UNITED STATES PATENT AND TRADEMARK OFFICE
CERTIFICATE OF CORRECTION

PATENT NO. : 6,873,489 B2
APPLICATION NO. : 10/107832
DATED : March 29, 2005
INVENTOR(S) : Peter Kui Ho and Mantle Man-Hon Yu It is certified that error appears in the above-identified patent and that said Letters Patent is hereby corrected as shown below:

Column 14, line 5, delete "operations removing" and add -- operations by removing -- .

Signed and Sealed this

Sixteenth Day of January, 2007

JON W. DUDAS
*Director of the United States Patent and Trademark Office*